United States Patent
Ichihashi

(10) Patent No.: US 6,788,369 B2
(45) Date of Patent: Sep. 7, 2004

(54) CHOLESTERIC LIQUID CRYSTAL COLOR FILTER AND PROCESS FOR PRODUCING THE SAME

(75) Inventor: Mitsuyoshi Ichihashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/154,810

(22) Filed: May 28, 2002

(65) Prior Publication Data

US 2003/0076468 A1 Apr. 24, 2003

(30) Foreign Application Priority Data

May 28, 2001 (JP) ......................................... 2001-159358

(51) Int. Cl.[7] ........................ G02F 1/1335; C09K 19/02; C09K 19/00
(52) U.S. Cl. ........................ 349/115; 349/113; 349/184; 428/1.1
(58) Field of Search ................................ 349/106, 113, 349/115, 184, 185; 428/1.1; 252/299.61–64

(56) References Cited

U.S. PATENT DOCUMENTS

| 6,344,300 | B1 | * | 2/2002 | Baba et al. ..................... 430/7 |
| 6,597,856 | B2 | * | 7/2003 | Van De Witte et al. .... 385/141 |
| 2002/0085147 | A1 | * | 7/2002 | Ko ............................. 349/106 |
| 2002/0130993 | A1 | * | 9/2002 | Ichihashi et al. ........... 349/106 |

* cited by examiner

*Primary Examiner*—Tarifur R. Chowdhury
(74) *Attorney, Agent, or Firm*—Sughrue Mion, PLLC

(57) ABSTRACT

A selectively reflective film and a process for producing the selectively reflective film, comprising the steps of forming on a substrate, a layer of a liquid crystal composition comprising a liquid crystal compound, a photoreactive chiral compound and a polymerization initiator; irradiating the layer with a first light to establish a distribution of exposure in the liquid crystal composition; raising the temperature of the liquid crystal composition layer to transform the composition into a liquid crystal state, thereby forming an area where selective reflection is attained in accordance with the distribution of exposure; and irradiating the liquid crystal composition with a second light to cause polymerization or cross-linking and thereby harden the composition.

20 Claims, 3 Drawing Sheets

CHOLESTERIC LIQUID CRYSTAL COLOR FILTER AND PROCESS FOR PRODUCING THE SAME

BACKGROUND OF THE INVENTION

1. Field of the Invention

The present invention relates to a selectively reflective film which includes a liquid crystal composition and is capable of high quality color reproduction and high quality image display and which is used, for example, in displays such as LCDs and constitutes a phase-difference film, a color filter, a circularly polarized light reflector or the like, as well as to a process for producing the selectively reflective film.

2. Description of the Related Art

Color filters used in, for example, color liquid crystal displays or the like are generally composed of red (R), green (G) and blue (B) pixels, and a black matrix arranged therebetween for improving display contrast.

Since an efficient process for readily producing high quality color filters with less waste of raw materials has been desired and since high transmissivity and high color purity are required of color filters, color filters mainly comprising a liquid crystal material (particularly, cholesteric liquid crystal) have widely been studied in recent years.

Since a color filter made mainly of cholesteric liquid crystal is of a type using polarized light, which reflects light having predetermined wavelengths and transmits light of other wavelengths, the color filter can efficiently utilize light and is excellent in transmittance and color purity. Although a spin coating method is usually employed to form a color filter film because uniform thickness can easily be attained, this method involves a large waste of raw materials, and hence is disadvantageous in terms of costs. In consideration of the foregoing, a production process using a photoreactive chiral compound is particularly useful.

If a liquid crystal composition containing a photoreactive chiral compound is used, isomerization of the chiral compound progresses when the compound is patternwise irradiated with light having wavelengths to which the chiral compound is photosensitive, depending on the intensity of the irradiation energy. This causes a change in helical pitch (twist angle of the helix) of the liquid crystal compound, whereby desired selectively reflected color lights can easily be obtained in respective pixels simply by conducting patterning exposure having varied light quantities.

In recent years, the level of performance required of color images is very high, and color filters are especially required to achieve high purity and high resolution.

Other optical films such as phase-difference films and circularly polarized reflectors are required to exhibit a large anisotropy of a refractive index (Δn) of film in order to have good optical characteristics. In general, the thicker the film is, a larger value of Δn is obtained. However, production of thick films is disadvantageous in view of costs, and thus the trend is toward production of thinner films.

In a case where a film or layer (for example, a color filter film or a phase-difference film) containing a liquid crystal composition is formed by applying coating, an undesirable state occurs in that even if treatment is conducted to align the liquid crystal molecules parallel to a substrate at a substrate side of the film or layer, the inclination angle (pretilt angle) of the liquid crystal molecules continuously changes to that of the thickness direction of the layer, particularly when using a low-molecular weight liquid crystal composition. Such a state is caused by the fact that since one surface of the color filter forming layer faces air, the liquid crystal molecules orient perpendicular to the substrate at the side interfacing with air. Therefore, this layer usually needs be disposed between alignment layers. In a case where the liquid crystal composition is polymerized for use as an optical film, however, it is necessary to peel off at least one of the above-mentioned alignment layers after polymerization in order to achieve a light weight and thinness. Thus, there have been problems in that increased steps are required, such as that of producing and removing the alignment layers, and larger amounts of wastes are produced.

SUMMARY OF THE INVENTION

In view of the aforementioned problems, it is therefore an object of the present invention to provide a process for readily producing a selectively reflective film through a simple and easily practiciable aligning treatment. The process avoids a decrease in color hues and in resolution, resulting from blurring of color hues at pixel boundaries, achieves selectively reflected color hues having higher color purity and excellent resolution, and further prevents mask blemish. Another object of the present invention is to provide a selectively reflective film which is obtainable by this process and exhibits high selectively reflected color hues and excellent resolution.

Through intensive research, the inventors have made the following findings regarding optical characteristics (particularly regarding improvements in selectively reflected color hues and in resolution) exhibited by selectively reflective films.

In a process for producing a color filter including a selectively reflective film containing a photoreactive chiral compound using a photoreactive cholesteric liquid crystal composition, it is possible to conduct patterning exposure once through a mask having a different light transmittance. However, when using the liquid crystal composition (layer) in a liquid crystal state, during a process after exposure until the layer is hardened via irradiation, the chiral agent, isomerized by different illumination intensities for respective pixels, is likely to diffuse between adjacent areas (colored pixels), whereby color hues are blurred at pixel boundaries causing a decrease in color purity and in resolution. Moreover, at the time of patterning exposure, it is necessary to arrange the mask as closely as possible to the composition (layer). Accordingly mask blemish occurs while the liquid crystal composition is in a liquid crystal state, and hence sufficient resolution cannot be obtained at portions where the mask is not adhered closely to the composition.

In view of the foregoing, the objects stated above are attained by imagewise irradiating a liquid crystal composition (layer) with light while the liquid crystal composition is in a substantially non-liquid crystal phase state.

Accordingly, a first aspect of the present invention provides a process for producing a selectively reflective film comprising the steps of:

forming, on a substrate, a liquid crystal composition layer exhibiting a smectic phase state, a microcrystalline state or a glass state, the liquid crystal composition containing a photoreactive chiral compound, a polymerization initiator, and a liquid crystal compound having at least one polymerizable group;

establishing a distribution of exposure in the liquid crystal composition layer by irradiating the liquid crystal composition layer exhibiting the smectic phase state, the microcrystalline state or the glass state with a first light;

forming a selectively reflective area in accordance with the distribution of exposure by raising the temperature of the liquid crystal composition layer, in which the distribution has been established, such that the liquid crystal composition is transformed to a liquid crystal state; and hardening the liquid crystal composition by irradiating the liquid crystal composition layer, in which the selectively reflective area has been formed, with a second light to cause polymerization or cross-linking.

A second aspect of the present invention provides a selectively reflective film obtained by a production process comprising the steps of:

forming, on a substrate, a liquid crystal composition layer exhibiting a smectic phase state, a microcrystalline state or a glass state, the liquid crystal composition containing a photoreactive chiral compound, a polymerization initiator, and a liquid crystal compound having at least one polymerizable group;

establishing a distribution of exposure in the liquid crystal composition layer by irradiating the liquid crystal composition layer exhibiting the smectic phase state, the microcrystalline state or the glass state with a first light;

forming a selectively reflective area in accordance with the distribution of exposure by raising the temperature of the liquid crystal composition layer, in which the distribution has been established, such that the liquid crystal composition is transformed to a liquid crystal state; and hardening the liquid crystal composition by irradiating the liquid crystal composition layer, in which the selectively reflective area has been formed, with a second light to cause polymerization or cross-linking.

In the selectively reflective film according to the second aspect of the present invention, i.e., the selectively reflective film obtained by a production process comprising the steps of: forming, on a substrate, a liquid crystal composition layer exhibiting a smectic phase state, a microcrystalline state or a glass state, the liquid crystal composition containing a photoreactive chiral compound, a polymerization initiator, and a liquid crystal compound having at least one polymerizable group; establishing a distribution of exposure in the liquid crystal composition layer by irradiating the liquid crystal composition layer exhibiting the smectic phase state, the microcrystalline state or the glass state with a first light; forming a selectively reflective area in accordance with the distribution of exposure by raising the temperature of the liquid crystal composition layer, in which the distribution has been established, such that the liquid crystal composition is transformed to a liquid crystal state; and hardening the liquid crystal composition by irradiating the liquid crystal composition layer, in which the selectively reflective area has been formed, with a second light to cause polymerization or cross-linking, the liquid crystal compound exhibits helical structure and the helical structure is fixed in a state such that a helical axis is oriented substantially parallel to the direction of the normal line of the surface of the selectively reflective film when the liquid crystal compound undergoes polymerization or cross-linking. This selectively reflective film is an optical film which displays selectively reflective wavelengths (colors) ranging from ultraviolet light to infrared light.

As used herein, the wording "the liquid crystal layer exhibits a smectic phase state, a microcrystalline state or a glass state" (hereinafter occasionally referred to as a "non-liquid crystal state" or "non-liquid crystal phase") means that the liquid crystal composition is in the state of a substantially non-liquid crystal phase, such as a crystal state or an amorphous state, and that the components present in the composition, such as the liquid crystal compound and the chiral compound, exhibit a polycrystal state. In particular, the smectic phase state refers to a state having a structure in which the molecules are aligned in a layered form and exhibiting higher viscosity than a nematic phase, due to a higher order than that of a nematic liquid crystal and a very low level of fluidity.

Accordingly, the non-liquid crystal state does not substantially exhibit any structural change (change in helical pitch) effected by the photoreactive chiral compound through isomerization by light. That is, the non-liquid crystal state does not exhibit cholesteric properties (selective reflectivity).

DESCRIPTION OF THE PREFERRED EMBODIMENTS

Figure 1A:
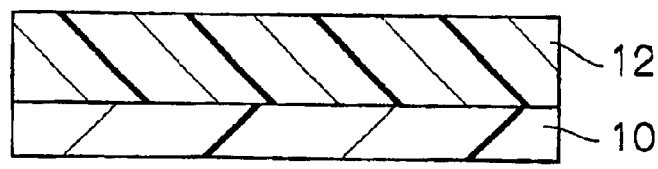
FIGS. 1A to 1E are schematic drawings showing the steps to form a cholesteric liquid crystal layer in the process for producing a selectively reflective film of the present invention.

In the process for producing a selectively reflective film of the present invention, a liquid crystal composition (layer) exhibiting a smectic phase state, a microcrystalline state or a glass state is imagewise irradiated with a first light, to establish a distribution of exposure in the liquid crystal composition layer, followed by raising the temperature of the liquid crystal composition layer (heating) to form a visible pattern. The selectively reflective film of the invention can be obtained by this process for producing the selectively reflective film.

Description will be given below of the selectively reflective film of the present invention and the process for producing the same.

<Process for Producing Selectively Reflective Film>

The process for producing the selectively reflective film of the present invention comprises the steps of:

forming, on a substrate, a liquid crystal composition layer exhibiting a smectic phase state, a microcrystalline state or a glass state, the liquid crystal composition containing a photoreactive chiral compound, a polymerization initiator (and preferably comprising a solvent), and a liquid crystal compound having at least one polymerizable group (hereinafter occasionally referred to as a "cholestric liquid crystal composition") (hereinafter occasionally referred to as the "layer-forming step"); establishing a distribution of exposure in the liquid crystal composition layer by irradiating the liquid crystal composition layer exhibiting the smectic phase state, the microcrystalline state or the glass state with a first light (hereinafter occasionally referred to as the "latent image-forming step"); forming a selectively reflective area in accordance with the distribution of exposure by raising the temperature of the liquid crystal composition layer, in which the distribution has been established, such that the liquid crystal composition is transformed to a liquid crystal state (hereinafter occasionally referred to as the "image-forming step"); and hardening the liquid crystal composition by irradiating the liquid crystal composition layer, in which the selectively reflective area has been formed, with a second light to cause polymerization or cross-linking (hereinafter occasionally referred to as the "fixing step"). This process may further comprise some other steps if necessary.

In more details, by irradiating the liquid crystal composition layer (hereinafter occasionally referred to as the "cholesteric liquid crystal layer") formed on the substrate through an applying or transferring method during the layer-forming step with the first light (wavelength: $\lambda^1$) to which the photoreactive chiral compound is photosensitive in accordance with the illumination intensity to cause isomerization (the latent image-forming step). Thereafter, the layer is heated such that the liquid crystal phase in a non-liquid crystal state is transformed into a liquid crystal state, to thereby cause a change in the helical structure of the liquid crystal compound. As a result, owing to this structural change, different selectively reflected colors are produced (image-forming step). At this point, desired color hues are exhibited depending on illumination intensities at desired respective regions. Then, the layer in this state is irradiated with the second light having a wavelength $\lambda^2$ ($\neq \lambda^1$) to cause polymerization or cross-linking such that the state of liquid crystal molecules are fixed (fixing step). Thus, selectively reflected images can be obtained.

Hereinafter, the respective steps are described in detail.

(Layer-forming Step)

In the layer-forming step, a liquid crystal composition layer exhibiting a smectic phase state, a microcrystalline state or a glass state (in other words, a non-liquid crystal state) is formed on a substrate by using a liquid crystal composition in a substantially non-liquid crystal state (the liquid crystal composition may be in a liquid crystal state at the time of being applied to the substrate).

This liquid crystal composition layer (cholesteric liquid crystal layer) can be formed on the substrate by transferring onto the substrate the cholesteric liquid crystal layer of a transfer material which comprises a tentative support having disposed thereon at least the liquid crystal composition layer, or directly applying onto the substrate a coating liquid containing the liquid crystal composition. Application of coating can be conducted by preparing a coating liquid of the liquid crystal composition, which contains the components to be described later, followed by coating the liquid through conventionally known methods using a bar coater, a spin coater or the like.

The thickness of the liquid crystal composition layer (cholesteric liquid crystal layer) is preferably from 1.5 to 4.0 $\mu$m. Details of the liquid crystal composition will be described later.

(Latent Image-forming Step)

In the latent image-forming step, the liquid crystal composition layer exhibiting a smectic phase state, a microcrystalline state or a glass state is imagewise irradiated with a first light, to establish a distribution of exposure in the liquid crystal composition layer.

In this step, the whole or a part containing a desired region to exhibit color is irradiated with the first light (wavelength: $\lambda^1$), to which the photoreactive chiral compound present in the layer is photosensitive, to cause from-trans-to-cis isomerization. At this stage, the liquid crystal composition does not exhibit liquid crystal properties and maintains a substantially non-liquid crystal state. Therefore, the liquid crystal compound does not undergo a structural change due to isomerization of the photoreactive chiral compound. Thus, the liquid crystal compound maintains a state in which a latent image is formed in accordance with the distribution of exposure (a state not exhibiting desired selective reflectivity).

In the present invention, it is important that the liquid crystal composition in a non-liquid crystal phase state is irradiated with light having the wavelength $\lambda^1$. By this irradiation, a distribution of exposure (that is, a state in which the photoreactive chiral compound in the layer have patternwise been isomerized in accordance with the illumination intensity of light) is established.

At this point, irradiation with light (wavelength: $\lambda^1$) may be conducted in an arbitrary area in the cholesteric liquid crystal layer. That is, light irradiation may be conducted on an entire surface of the cholesteric liquid crystal layer or in a desired area to exhibit colors. Alternatively, imagewise irradiation may be carried out. From the viewpoint that the process of production can readily be conducted without limitation, it is preferable to perform an embodiment in which irradiation areas are not restricted.

The wavelength $\lambda^1$ is preferably specified within the photosensitive wavelength range of the photoreactive chiral compound, particularly to a wavelength close to the peak photosensitive wavelength thereof so that sufficient patterning sensitivity can be obtained.

The irradiation quantity, or the illuminance (illumination intensity) of light of wavelength $\lambda^1$ is not particularly limited, and can suitably be selected depending on raw materials to be used, so as to provide sufficient photosensitivity. Light sources emitting ultraviolet rays are preferably used since the sources have a high energy so that the structural change and polymerization reaction of the liquid crystal compound can be promptly attained. Examples thereof include a high-pressure mercury lamp, a metal halide lamp, and an Hg—Xe lamp. The light source preferably has a function of varying light quantities.

When irradiating light of wavelength $\lambda^1$, a mask may be used if necessary. The mask can suitably be selected from conventionally known masks, for example, a mask in which openings are arranged in a pattern form, and a mask having a distribution of light-transmittance defined in a pattern form.

As described above, the first exposure is performed at the stage that the liquid crystal composition is in a non-liquid crystal state. Hence, when a mask having areas different in transmitting light quantities is used for patterning exposure once, it is possible in the fixing step, to be detailed later, to prevent diffusion of the chiral compound, isomerized by light having different light quantities per pixel, between adjacent areas (colored pixels). Consequently, it is possible to effectively prevent a decrease in color purity or resolution, resulting from blurring of color hues at pixel boundaries. It is also possible to avoid mask blemish in the case where the mask is arranged to closely adjacent to the cholesteric liquid crystal layer at the time of patterning exposure. Since the mask blemish can be avoided, the mask can be arranged closely adjacent to the layer, to thereby achieve higher resolution.

(Image-forming Step)

In the image-forming step, the temperature of the liquid crystal composition layer in which a distribution of exposure has been established is elevated to transform the composition into a liquid crystal state, thereby forming a region to exhibit selective reflection in accordance with the distribution of exposure. As described above, in the present invention, the latent image-forming step is performed at least using the liquid crystal composition in a non-liquid crystal state. Therefore, in this step, the liquid crystal composition layer is heated to make the composition transform into a liquid crystal state, whereby the latent image having been formed in the latent image-forming step is made visible.

In this step, therefore, regions to exhibit selective reflection of desire colors are formed. The region may be made of a single color developing area, or two or more color developing areas having different selective reflection of light of different wavelengths (areas developing plural colors). An example of the products which are composed of the two or more color developing areas and exhibit selective reflection of light having different wavelengths is a color filter.

The degree of temperature to be raised varies depending on the components in the cholesteric liquid crystal layer, and is preferably specified such that the liquid crystal composition used can be transformed into a liquid crystal state and the structural change (change in helical pitch), resulting from isomerization of the photoreactive chiral compound, is not inhibited. Specifically, the preferable temperature is approximately from 60 to 120° C.

(Fixing Step)

In the fixing step, the liquid crystal composition layer in which the region described above have been formed is irradiated with a second light (wavelength: $\lambda^2$ ($\neq\lambda^1$)), to cause polymerization or cross-linking such that the aligned structure (helical pitch) of the liquid crystal is hardened or cured by polymerization.

By conducting irradiation with light of wavelength $\lambda^1$ followed by another irradiation with light of wavelength $\lambda^2$, to fix the alignment of liquid crystal molecules, whereby selective reflection of light having predetermined wavelengths can unchangeably be maintained. It is advisable to irradiate light of wavelength $\lambda^2$ according to an embodiment in which imagewise exposure can be performed for polymerizing the liquid crystal composition. The irradiation with light of wavelength $\lambda^2$ may not necessarily be performed imagewise. For example, in the case where color-formation at the latest stage of producing a color filter (in the case of producing a color filter exhibiting three colors, R, G and B, the production of the third color light) is performed in all areas where the liquid crystal is not fixed, it is advisable that the entire surface is irradiated with light. By irradiating the entire surface, the liquid crystal composition is imagewise polymerized and hardened so that a final pattern is formed.

The wavelength $\lambda^2$ is preferably specified within the photosensitive wavelength range of the polymerization initiator, particularly to a wavelength close to the peak photosensitive wavelength thereof so that sufficient photopolymerizing sensitivity can be obtained.

The irradiation quantity, or the illuminance (illumination intensity) of light of wavelength $\lambda^2$ is not particularly limited, and can suitably be selected depending on raw materials to be used, so as to provide sufficient photosensitivity. Light sources used for irradiating light of wavelength $\lambda^2$ may be the same light source as used for irradiating light of wavelength $\lambda^1$, and have a function of varying light quantities.

As described above, irradiating the cholesteric liquid crystal composition with light allows color-hue adjustment by changing the cholesteric liquid crystal phase into a state exhibiting a desired selective reflection (color-development by selective reflection of light) and patterning, and also fixation of selective reflection of light of a predetermined wavelength by polymerizing and hardening the cholesteric liquid crystal phase.

(Liquid Crystal Composition)

Hereinafter, description is made of respective components which constitute the liquid crystal composition.

The liquid crystal composition comprises substantially a liquid crystal compound having at least one polymerizable group, a photoreactive chiral compound, and a polymerization initiator. Preferably, the liquid crystal composition may suitably be used in the form of a coating liquid with the aid of a solvent. The composition may further comprise an air interface alignment agent. If necessary, the composition may still further comprise a polymerizable monomer, a binder resin, a solvent, a polymerization inhibitor, a thickener, a dye, a pigment, an ultraviolet absorber, a gelatinizer, and other components. An embodiment which uses a polymerizable monomer simultaneously is preferable. Specific examples of the manners in which the liquid crystal composition is used will be described later.

Liquid Crystal Compound Having at Least One Polymerizable Group-

The liquid crystal compound having at least one polymerizable group (hereinafter occasionally referred to simply as a "liquid crystal compound") may suitably be selected from conventionally known liquid crystal compounds having polymerizable groups. Particularly preferable is a nematic liquid crystal compound in the shape of rods (hereinafter simply referred to as a "nematic liquid crystal compound").

The nematic liquid crystal compound may suitably be selected from liquid crystal compounds, high molecular weight liquid crystal compounds, and polymerizable liquid crystal compounds having anisotropy of a refractive index $\Delta n$ of 0.10 to 0.40. By using the nematic liquid crystal compound in combination with a photoreactive chiral compound, a cholesteric liquid crystal composition can be produced. The nematic liquid crystal compound can be aligned by using an aligned substrate, which has undergone aligning treatment such as rubbing, while the compound is in a molten and liquid crystal state. In the case where the liquid crystal state is fixed in a solid phase, means such as cooling or polymerization can be employed. Since the liquid crystal compound has a polymerizable group and exhibits very high reactivity, a tough film can be obtained by effectively polymerizing the compound in an aligned state.

Among the nematic liquid crystal compounds, preferable are, for example, liquid crystal compounds in which a UV-curable type functional group (e.g., an acrylate group), which is sensitive to ultraviolet rays to cause polymerization and hardening, has been introduced into the molecule. If such a compound is irradiated with ultraviolet rays for curing, a color filter having enhanced strength can be produced at a low temperature of 120° C. or lower.

Specific examples of nematic liquid crystal compounds include the following compounds. In the present invention, however, the nematic liquid crystal compounds are not limited thereto.

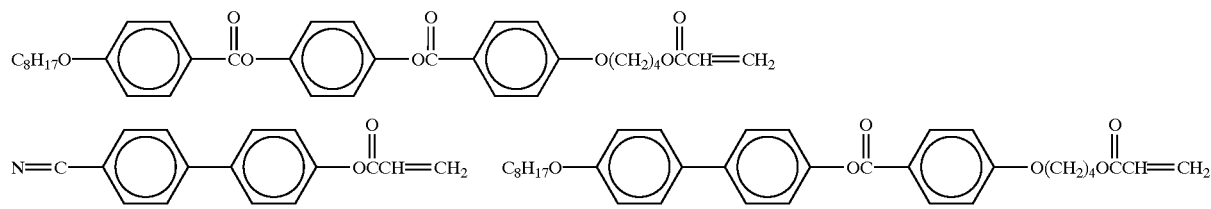

-continued
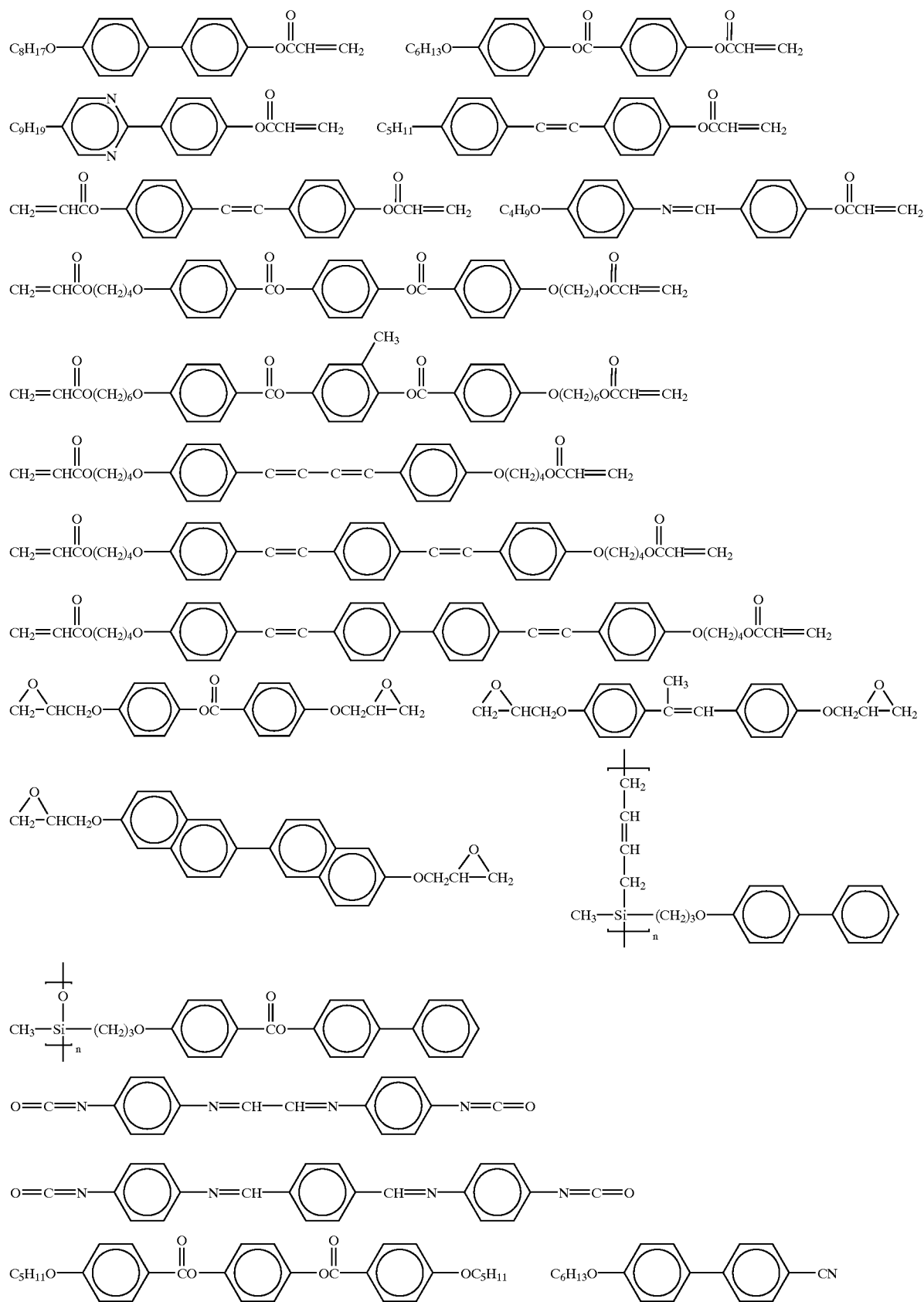

In the above formulae, n represents an integer of from 1 to 1,000.

Also usable as preferable examples are compounds similar to the compounds exemplified above, in which a linking group of an aromatic ring is replaced with any group having the following structure.

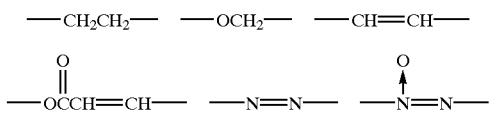

Among the compounds listed above, compounds carrying in their molecule a polymerizable group or a cross-linking group are preferable as the nematic liquid crystal compound since they provide excellent curability and stable heat resistance of the layer to be formed.

The liquid crystal compounds may be used singly or in combination of two or more. A liquid crystal compound having no polymerizable group may be used together with the "liquid crystal compound having at least one polymerizable group".

The addition amount of the "liquid crystal compound having at least one polymerizable group" is preferably from 30 to 98%, more preferably from 50 to 95%, by mass relative to the total solid content (mass) of the liquid crystal composition (cholesteric liquid crystal composition). If the amount is less than 30% by mass, alignment becomes insufficient, occasionally impairing selective reflection of color light desired.

Photoreactive Chiral Compound

The photoreactive chiral compound is a compound which exhibits twisting property when irradiated with light (from ultraviolet, through visible to infrared) and causes a change in helical pitch induced in the cholesteric liquid crystal composition. This compound has, as essential portion (a molecular structure unit), a chiral moiety and a moiety to undergo a structural change by irradiation with light. Both moieties are preferably contained in one molecule.

In the present invention, it is possible to use the photoreactive chiral compound together with a chiral compound which exhibits twisting property having high temperature dependency and exerts no photoreactivity.

The photoreactive chiral compound preferably has a peak photosensitive wavelength which is longer than that of the polymerization initiator in order to improve patterning sensitivity.

The photoreactive chiral compound is preferably a compound which has an enhanced ability to induce the helical structure of the cholesteric liquid crystal composition. For this purpose, it is preferable to position the chiral moiety at the center of the molecule and render the periphery portions to have a rigid structure. The molecular weight of the photoreactive chiral compound is preferably 300 or more. In order to increase the ability to induce the helical structure by irradiation with light, it is preferable to use a compound whose structural change caused by the irradiation is large and whose chiral moiety is arranged closer to the moiety to undergo a structural change by the irradiation.

The photoreactive chiral compound which is highly soluble in a nematic liquid crystal compound is preferable, and particularly preferable is the compound having a solubility parameter (SP) value closer to that of the polymerizable liquid crystal monomer. When the chiral compound has a structure into which one or more polymerizable bonding groups have been introduced, an optical film produced (selectively reflective film) can have enhanced heat resistance.

Examples of the structure of photoreactive moieties which undergo a structural change by irradiation with light include those described in "Photochromic Compounds" (written by Kingo Uchida and Masahiro Irie, Chemical Industry, Vol. 64, p.640, 1999, and written by Kingo Uchida and Masahiro Irie, Fine Chemical, vol. 28(9), p.15, 1999).

Specific examples are described hereinafter. In the present invention, however, the photoreactive chiral compounds are not limited thereto.

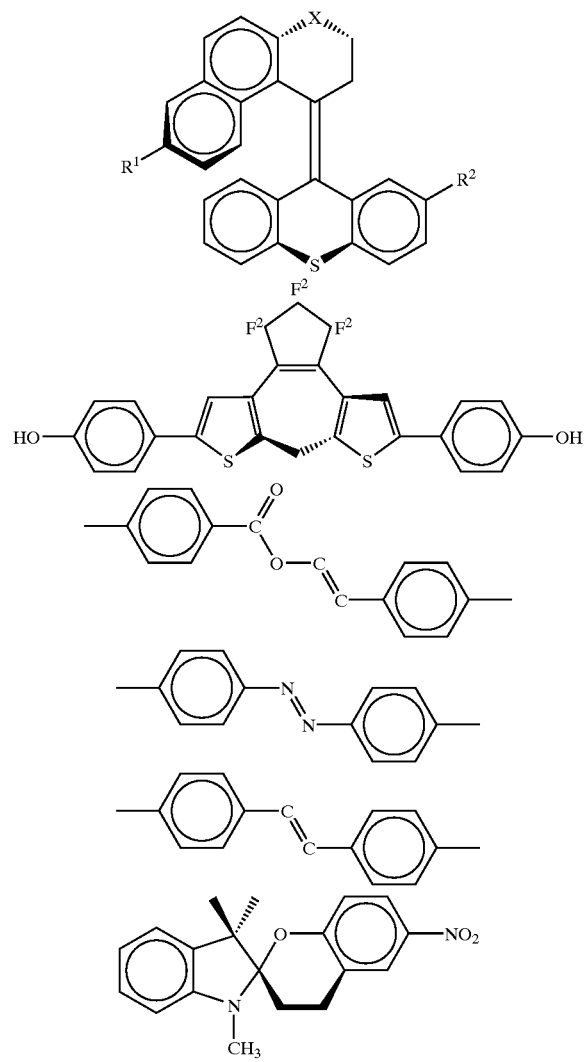

In the above formula, $R^1$ and $R^2$ each represent an alkyl group, an alkoxy group, an alkenyl group or an acryloyloxy group.

The chiral moiety may be a moiety at which decomposition, addition reaction, isomerization, dimerization or the like is effected by irradiation with light to thereby cause an irreversible structural change.

Furthermore, the chiral moiety corresponds to the position of an asymmetric carbon bonded to four different substituents, for example, as shown by the symbol * in the compounds illustrated below (Chemistry of Liquid Crystal, No. 22, Hiroyuki Nohira, Chemistry Review, p.73, 1994).

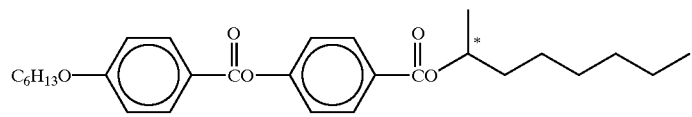
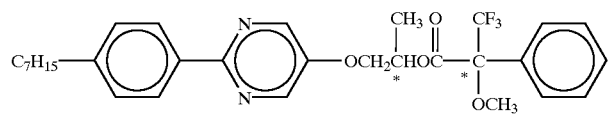
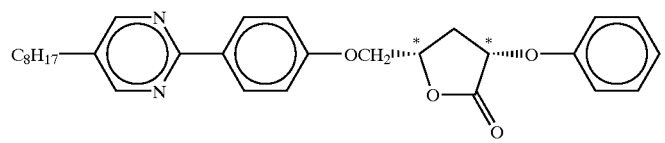
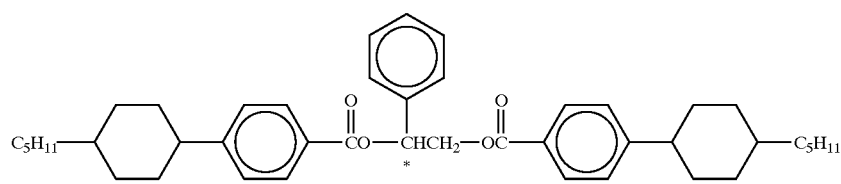
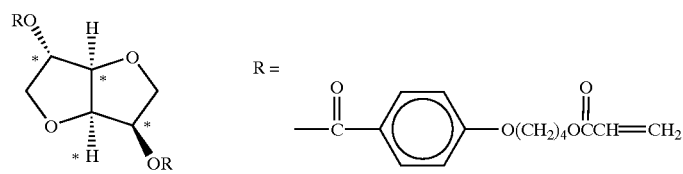
As an example of photoreactive chiral compounds having both a chiral moiety and a photo-isomerizable moiety, the following compound is exemplified.
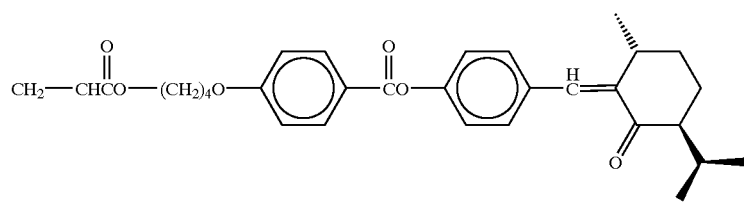
Also preferable is a photoreactive chiral compound represented by the following general formula (I) or (II):
general formula (I)
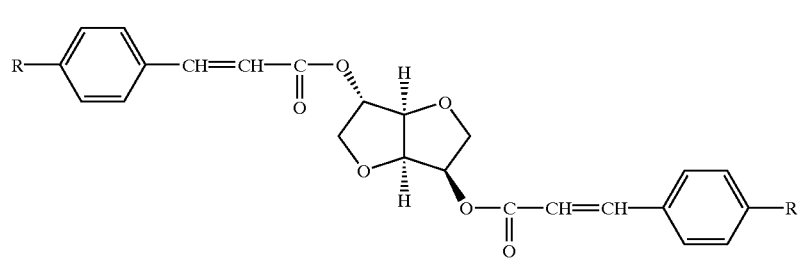

general formula (II)

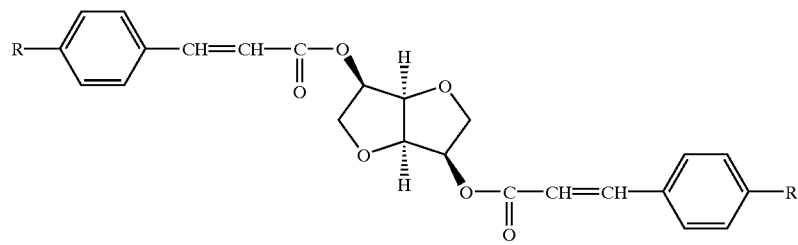

In the general formulae (I) and (II) shown above, R represents a hydrogen atom, an alkoxy group having 1 to 15 carbon atoms, an acryloyloxyalkyloxy group having a total of 3 to 15 carbon atoms, or a methacryloyloxyalkyloxy group having a total of 4 to 15 carbon atoms.

For the compound represented by the general formula (I), examples of the R group are exemplified hereinafter (compounds (1) to (15)). In the present invention, however, the compounds represented by the general formula (I) are not limited thereto.

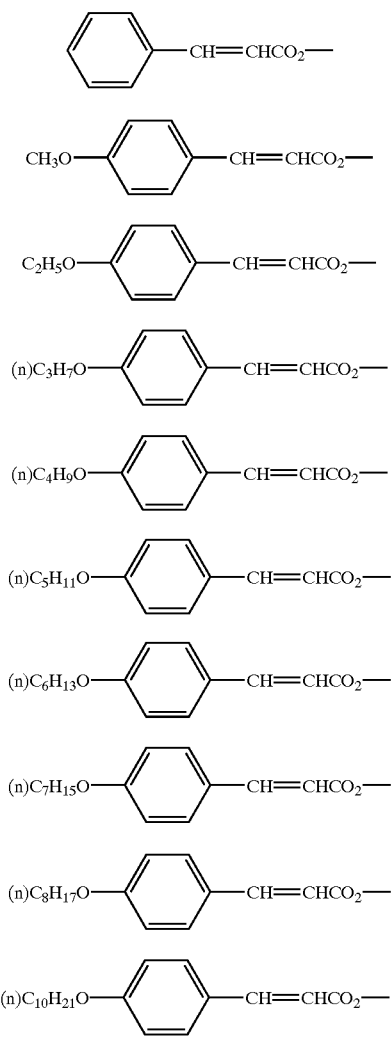

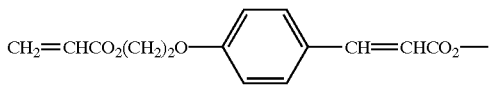

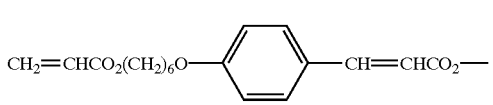

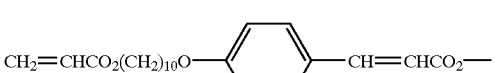

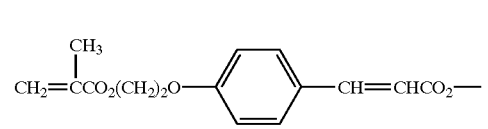

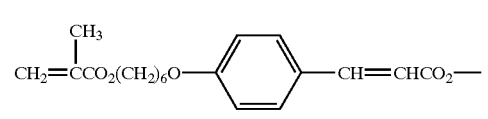

The addition amount of the photoreactive chiral compound in the liquid crystal composition (cholesteric liquid crystal composition) may suitably be selected without imposing any limitation. Preferably, the amount is from about 2 to 30% by mass.

Polymerization Initiator

The polymerization initiator contributes to promote polymerization reaction through an unsaturated bond, to polymerize and harden the liquid crystal composition for fixing, and improve strength of the liquid crystal composition after fixing. The polymerization initiator can suitably be selected from known compounds exhibiting photoreactivity, thermal reactivity or the like, among which a polymerization initiator capable of promoting the reaction by irradiation with light is preferable. If the polymerization initiator is included in the composition, a polymerizing reaction for curing the cholesteric compound or the like can promptly be effected. Thus, selective reflection of color light having a large anisotropy of a refractive index (Δn) as well as high resolution and excellent color purity can stably be achieved.

The photopolymerization initiator can suitably be selected from conventionally known ones. Examples of the photopolymerization initiator include p-methoxyphenyl-2,4-bis (trichloromethyl)-s-triazine, 2-(p-butoxystyryl)-5-trichloromethyl-1,3,4-oxadiazole, 9-phenylacridine, 9,10-dimethylbenzphenazine, benzophenon/Michler's ketone, hexaarylbiimidazole/mercaptobenzimidazole, benzyl dimethyl ketal, and thioxanthone/amine.

The addition amount of the polymerization initiator is preferably from 0.1 to 20%, more preferably from 0.5 to 5% by mass relative to the solid content (mass) of the liquid crystal composition. If the addition amount is less than 0.1% by mass, hardening efficiency is lowered so that a prolonged time may be required for polymerization. If the addition amount is more than 20% by mass, light transmittance in a range of from ultraviolet to visible may be decreased.

Solvent

It is preferable to form a liquid crystal composition layer by applying a liquid crystal composition in the form of a coating liquid prepared by using a solvent together with each of the components. Through this method, a selectively reflective film exerting uniform thickness, even surface and excellent optical property can be formed.

Examples of the solvent include 2-butanone, cyclohexanone, methylene chloride and chloroform.

Air Interface Alignment Agent

An air interface alignment agent is a surfactant exerting an excluded volume effect. As used herein, having an excluded volume effect means control of aligning liquid crystal molecules at the air interface side, that is, three-dimensional control of a spatial alignment state of a liquid crystal at a layer surface interfacing with air when a layer including a liquid crystal composition is formed by application of coating. In more detail, this term means control of pretilt angles of liquid crystal molecules at the air interface side.

The requirements for a preferable molecular structure of an air interface alignment agent are to have a flexible hydrophobic moiety and a moiety having at least one ring unit and a structural stiffness (hereinafter referred to as a stiff moiety). The flexible hydrophobic moiety can be either a perfluoro chain or a long alkyl chain depending on the kind of a liquid crystal compound used. Since a hydrophobic moiety is flexible, the hydrophobic moiety can effectively be located on the air side.

An air interface alignment agent may be of a short molecular chain having a molecular weight of the order of several hundreds or of the polymer or the oligomer consisting of the short molecular chain. Furthermore, there may be included a polymerizable functional group in the molecule of the agent depending on the use purposes.

In a case where such an air interface alignment agent is used, a flexible hydrophobic moiety of an air interface alignment agent is arranged to the air interface; and at the same time, a stiff moiety is arranged to a liquid crystal molecule orientation, shaped to be flat and positioned in parallel to the air interface, to thereby permit alignment of liquid crystal molecules parallel to the air interface.

On the other hand, if a stiff moiety is oriented in a direction perpendicular to the air interface, liquid crystal molecules can be aligned in a direction perpendicular to the air interface.

Specifically, a nonionic surfactant is preferably used and the following compounds may be exemplified:

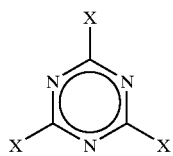

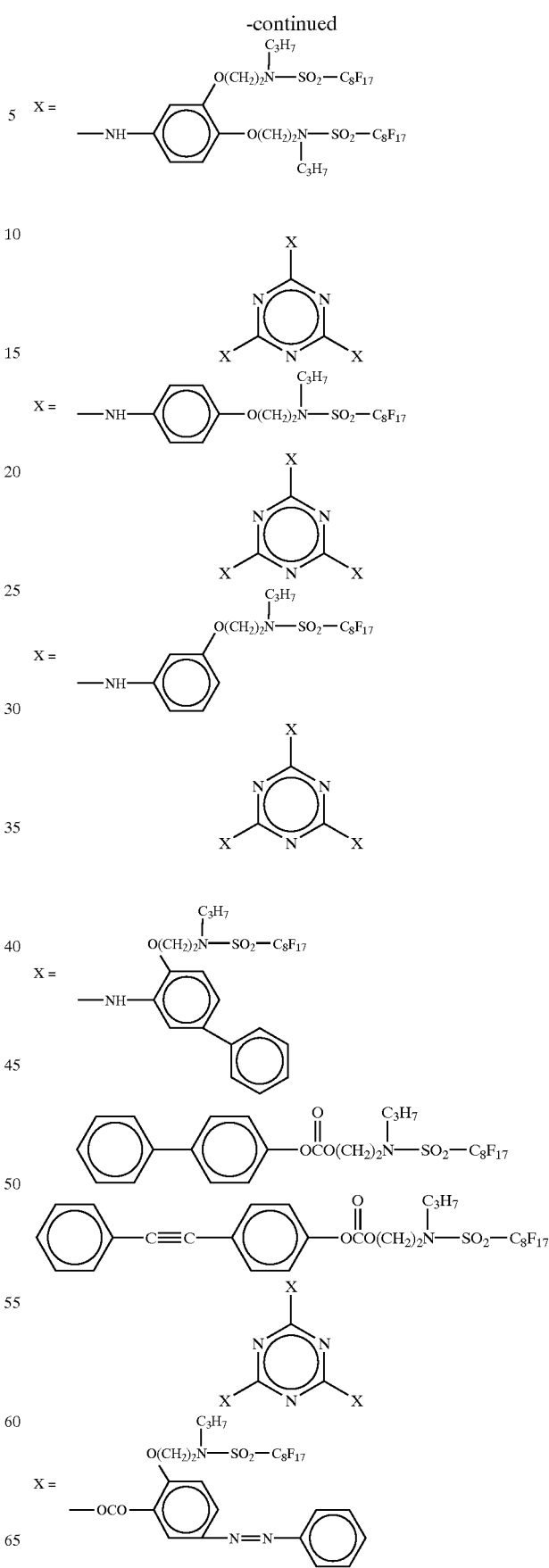

-continued

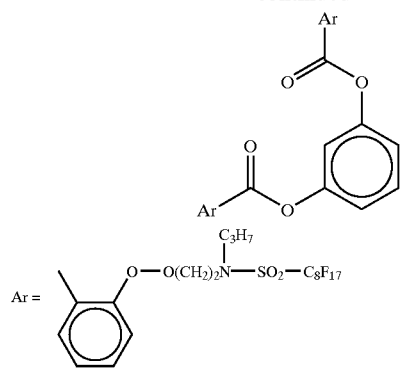
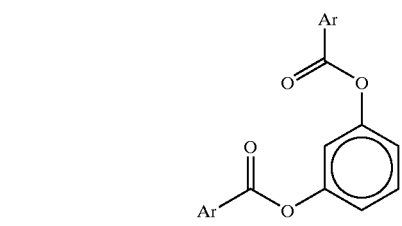
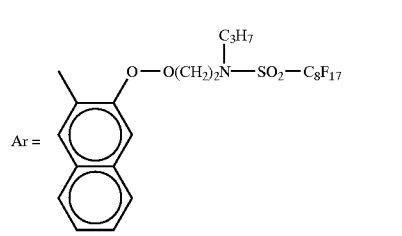
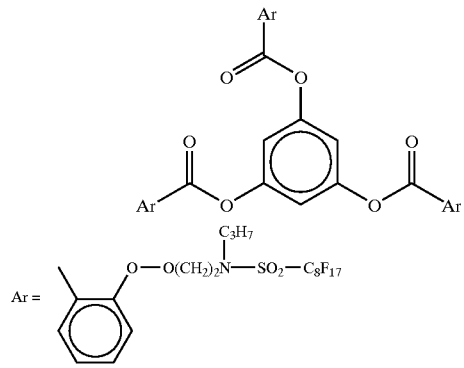
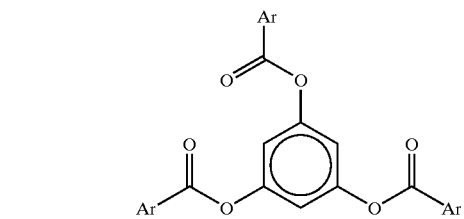
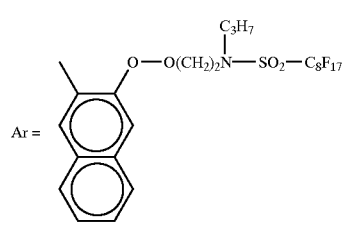

-continued

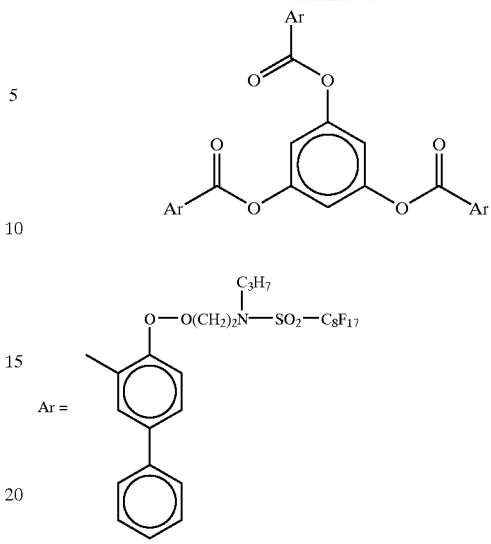

The addition amount of an air interface alignment agent is preferably a quantity to cover a surface of the air interface side of a layer including a liquid crystal composition by one molecule, and preferably of from 0.05 to 5 mass % and more preferably of from 0.1 to 1.0 mass % relative to a total solid content (mass) of the liquid crystal composition. When the addition amount is less than 0.05 mass %, the effects of the agent are not always exerted, while when the addition amount is in excess of 5 mass %, an air interface alignment agent itself occasionally causes an association, resulting in phase separation from liquid crystal.

If an air interface alignment agent is used, a surface tension can be decreased. Other kinds of surfactants than the air interface alignment agent can be used together with this agent for the purpose of further reducing a surface tension and improving coatability.

For example, in a case where a layer is formed by applying a liquid crystal composition in a state of a coating liquid, the surfactant serves to three-dimensionally control an alignment state at the surface of the layer interfacing with air, and especially in a case of a cholesteric liquid crystal phase, higher purity of color light having a selectively reflected wavelength can be obtained.

Polymerizable Monomer

A polymerizable monomer may also be used in the liquid crystal composition. If the polymerizable monomer is used therein, after the patterning (in the case of a cholesteric liquid crystal, the twisting power of the liquid crystal undergoes a change by irradiation with light to establish a distribution of selective reflection of light of wavelengths), the helical structure is fixed (selective reflectivity) and strength of the fixed liquid crystal layer (liquid crystal composition) can be enhanced. However, if the nematic liquid crystal compound has an unsaturated bond in the molecule, the polymerizable monomer needs not necessarily be included in the composition.

As the polymerizable monomer, a monomer having an ethylenically unsaturated bond may be exemplified. Specific examples thereof include polyfunctional monomers such as pentaerythritol tetraacrylate, dipentaerythritol hexaacrylate.

Specific examples of the monomer having an ethylenically unsaturated bond are shown below. However, these examples are not limiting the present invention.

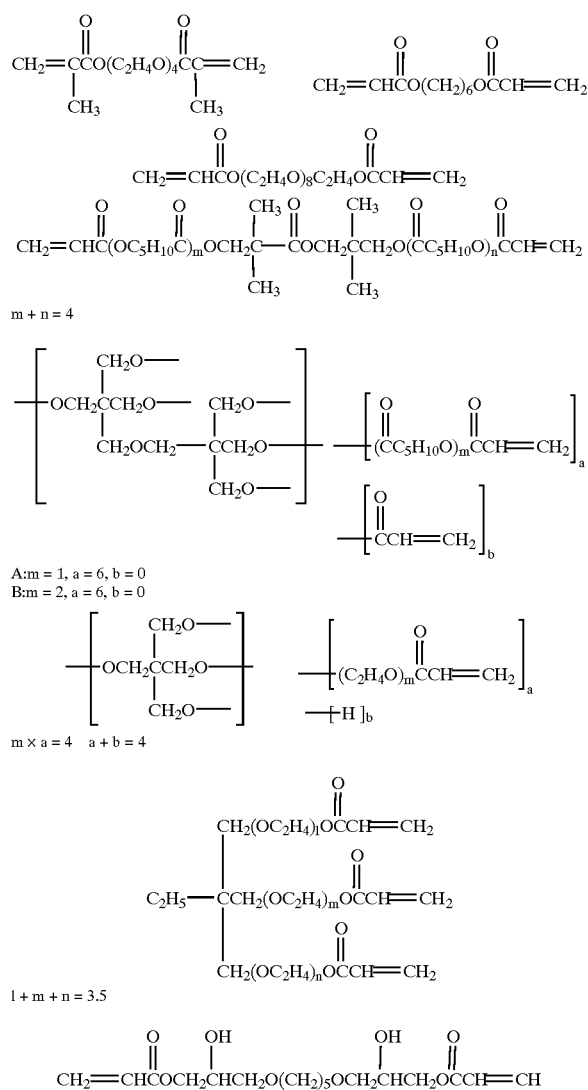

The addition amount of the polymerizable monomer is preferably from 0.5 to 50% by mass relative to a total solid content (mass) of the liquid crystal composition. If the amount is less than 0.5% by mass, sufficient curability may occasionally be impaired. If the amount is more than 50% by mass, alignment of the liquid crystal molecules is inhibited so that sufficient color-development may not be attained.

Additional Components

As additional components, the following may be included in the composition: a binder resin, a polymerization inhibitor, a solvent, a thickener, a dye, a pigment, an ultraviolet absorber, a gelatinizer and so on.

Since the additional components have influence on strength of the color filter film hardened by ultraviolet rays, it is preferable that the additional components have excellent compatibility with the nematic liquid crystal compound.

If these components can move within the hardened color filter film, separated components cause a decrease in strength of the film to change various properties of the color filter. It is therefore preferable to use, as the additional components to be included, components having a functional group similar to the polymerizable functional group having been introduced into the nematic liquid crystal compound. Namely, the additional components are fixed in the liquid crystal composition, without being separated in the film, by polymerization and hardening, whereby various properties of the film, such as strength, are not affected. The addition amount of the additional components other than a binder resin and a surfactant is preferably 10% or less by mass relative to the total sold content (mass) of the liquid crystal composition. If this amount is more than 10% by mass, strength of the optical film (selectively reflective film) may be lowered.

Examples of the binder resin include polystyrene compounds such as polystyrene and poly-α-methylstyrene; cellulose resins such as methylcellulose, ethylcellulose and acetylcellulose; acidic cellulose derivatives having, as its side chain, a carboxylic group; acetal derivatives such as polyvinyl formal and polyvinyl butyral; and methacrylic acid copolymer, acrylic acid copolymer, itaconic acid copolymer, crotonic acid copolymer, maleic acid copolymer and partially-esterized maleic acid copolymer described in Japanese Patent Application Laid-Open (JP-A) Nos. 59-44615, Japanese Patent Application Publication (JP-B) Nos. 54-34327, 58-12577 and 54-25957, JP-A Nos. 59-53836 and 59-71048.

As other examples of the binder resin, there may be exemplified a homopolymer of an acrylic acid alkyl ester and a homopolymer of methacrylic acid alkyl ester in which an alkyl group may preferably be a methyl, ethyl, n-propyl, n-butyl, iso-butyl, n-hexyl, cyclohexyl, 2-ethylhexyl or the like group.

Besides, the binder resin may be a polymer having a hydroxyl group to which is added an acid anhydride, benzyl (meth)acrylate/(methacrylic acid homopolymer)acrylic acid copolymer, a multiple copolymer of benzyl(meth)acrylate/ (meth) acrylic acid/another monomer, or the like.

Among the above-stated compounds, the binder resin having a carboxylic group is preferable from the viewpoint of developability with an alkaline solution after patterning and mass-productivity. In the case where the liquid crystal layer is formed on a plastic substrate (by coating, transferring or the like), use of a binder resin containing a carboxylic group, as the binder component, in a cholesteric liquid crystal composition prepared as a coating liquid form allows development with an alkaline solution. Development with an alkaline solution after irradiation with light facilitates patterning.

The addition amount of the binder resin in the liquid crystal composition is preferably from 0 to 50% by mass, and more preferably from 0 to 30% by mass. If the amount is more than 50% by mass, alignment of the nematic liquid crystal compound may become insufficient.

The polymerization inhibitor may be added to improve storability. Examples thereof include hydroquinone, hydroquinone monomethyl ether, phenothiazine, benzoquinone, and the derivatives thereof. The addition amount of the polymerization inhibitor is preferably from 0 to 10% by mass, more preferably from 0 to 5% by mass, relative to the amount of polymerizable monomer used.

The liquid crystal composition can be prepared by dissolving or dispersing the aforementioned respective components in the solvent described above and then formed into an arbitrary shape, or disposed onto a support or the like for use.

As one example of the process for producing a selectively reflective film of the present invention, a process for producing a color filter which is obtained by using a cholesteric liquid crystal composition is described in detail. The production of a color filter according to the process for producing a selectively reflective film of the present invention may comprise not only the above-mentioned steps but also the steps of aligning a surface contacting with a cholesteric liquid crystal composition (aligning step), adhering (laminating) a substrate onto a transfer material containing a liquid crystal layer and then peeling the transfer material to allow transferring of the liquid crystal layer onto the substrate (transferring step), applying a coating liquid of a cholesteric liquid crystal composition onto the substrate to form a liquid crystal layer (applying step), and so on, depending on the embodiment suitably selected.

A color filter may be prepared by a production process according to Embodiment A or B described below. A color filter can appropriately be produced by either one of the two embodiments.

Embodiment A (Step 1): The Step of Producing a Transfer Material.

A liquid crystal composition in a coating liquid form is applied onto a tentative support to produce a transfer material having at least a cholesteric liquid crystal layer.

The liquid crystal composition in a coating liquid form can be prepared by dissolving or dispersing respective components into a suitable solvent. It is sufficient to prepare a liquid crystal composition in a non-liquid crystal state (a smectic phase state, a microcrystalline state or a glass state). In some cases, the composition may have a liquid crystal state before the coating liquid applied is dried.

In the case where foreign matters or the like are present on a body to be transferred, a cushioning layer comprising a thermoplastic resin and the like may be disposed between the liquid crystal layer and the tentative support in order to secure adhesiveness at the time of transferring. It is also preferable to subject the surface of the cushioning layer to aligning treatment such as rubbing (aligning step).

(Step 2): The Layer-forming Step by Transferring the Cholesteric Liquid Crystal Layer.

The transfer material described above is laminated to a light-transmissible substrate (a base plate) followed by peeling the transfer material from the substrate to thereby form, on the substrate, a cholesteric liquid crystal layer in a smectic phase state, a microcrystalline state or a glass state (transferring step).

Besides the light-transmissible substrate, an image-receiving material comprising a substrate having disposed thereon an image receiving layer may be used. As will be carried out in Embodiment B to be detailed later, a liquid crystal layer may be formed by applying coating. However, the manner employing a transfer material is preferable from the viewpoints of waste of raw materials and costs.

(Step 3): Latent Image-forming Step, Image-forming Step and Fixing Step According to the Method of the Present Invention The cholesteric liquid crystal layer in a smectic phase state, a microcrystalline state or a glass state, on the substrate, is imagewise irradiated, through a photomask having a distribution of light-transmittance, with light having a wavelength $\lambda^1$, followed by heating to make the layer transform into a liquid crystal state such that regions to selectively reflect light of desired color hues are formed. Thereafter, the regions are irradiated with light having a wavelength $\lambda^2$ to harden and fix the resultant layer to display desired selective reflection of light of wavelengths in a desired pattern.

The steps used and ingredients for a transfer material, a support and so on are described in detail in Japanese Patent Applications Nos. 11-342896 and 11-343665 previously filed by the inventors.

Embodiment B (Step 1): Layer-forming Step by Applying a Coating Liquid for a Cholesteric Liquid Crystal Layer A coating liquid containing the liquid crystal composition is applied directly onto a substrate (support) which constitutes a color filter, to form a cholesteric liquid crystal layer in a smectic phase state, a microcrystalline state or a glass state. This liquid crystal layer can be formed by applying a coating liquid of the liquid crystal composition in the same manner as above onto the substrate through conventionally known methods using a bar coater, a spin coater or the like. The alignment layer similar to that employed as above may be disposed between the cholesteric liquid crystal layer and the substrate. The surface of the alignment layer is preferably subjected to aligning treatment such as rubbing [aligning step].

Figure 1B:
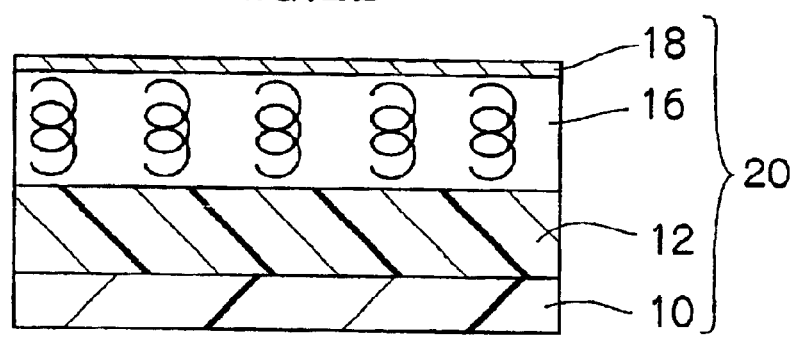
Figure 1C:
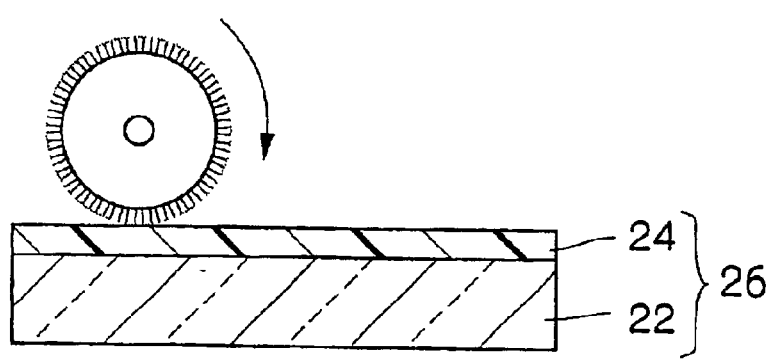

(Step 2): The Step, According to the Process of the Present Invention, Corresponding to Step 3 in Embodiment A Referring to FIGS. 1A to 1C, the process is described in more detail. FIGS. 1A to 1C are schematic diagrams showing formation of a color filter employing the process for producing a selectively reflective film of the present invention.

First, at least a liquid crystal compound, a photoreactive chiral compound, and a polymerization initiator are dissolved in a suitable solvent, to prepare a liquid crystal composition (cholesteric liquid crystal composition) in the form of a coating liquid.

As illustrated in FIG. 1A, a tentative support 10 is prepared, and the surface of the support 10 is coated with, for example, an acrylic resin, a polyester or a polyurethane to form a cushioning layer (thermoplastic resin layer) 12. Furthermore, an alignment layer made of polyvinyl alcohol or the like may be laminated onto the layer 12. If necessary, this alignment layer may be subjected to rubbing to improve aligning property (aligning step).

Then, as illustrated in FIG. 1B, the liquid crystal composition in a coating liquid form is applied onto the cushioning layer 12, and then dried to form a cholesteric liquid crystal layer 16 in a smectic phase state, a microcrystalline state or a glass state (in a non-liquid crystal state). Thereafter, a cover film 18 is provided on this cholesteric liquid crystal layer 16 to thereby form a transfer material. This transfer material is hereinafter referred to as a transfer sheet 20.

As illustrated in FIG. 1C, another substrate 22 is separately prepared, and an alignment layer 24 is formed on the substrate 22 in the same manner as above, followed by rubbing (aligning step). The resultant substrate is hereinafter referred to as a color filter substrate 26.

Figure 1D:
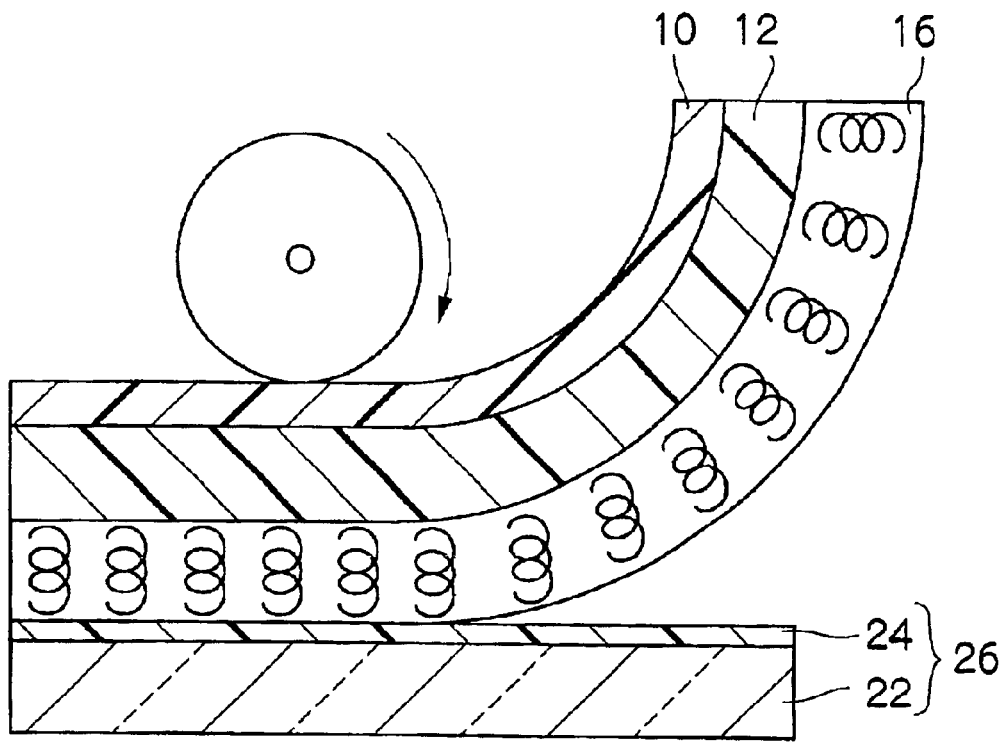
Figure 1E:
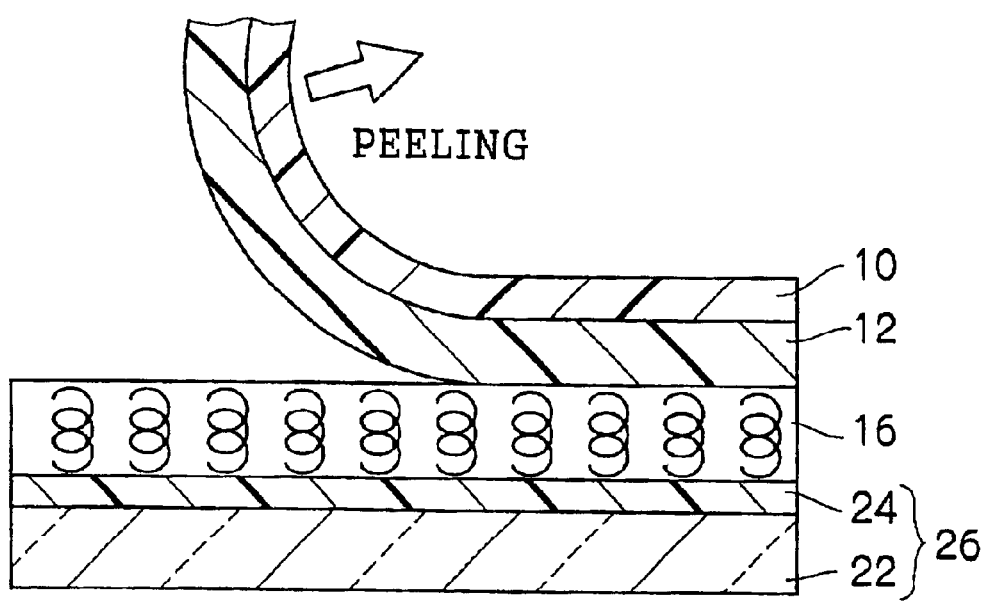

Then, the cover film 18 of the transfer sheet 20 is peeled off. As illustrated in FIG. 1D, the surface of the cholesteric liquid crystal layer 16 of the transfer sheet 20 is brought into contact with the surface of the alignment layer 24 of the color filter substrate 26, followed by lamination through a roll rotating in the direction of an arrow shown in FIG. 1D. Thereafter, as illustrated in FIG. 1E, the cholesteric liquid crystal layer 16 of the transfer sheet 20 is peeled off from the cushioning layer 12, whereby the cholesteric liquid crystal layer is transferred onto the color filter substrate 26 (transferring step). In this case, the cushioning layer 12 needs not necessarily be peeled off together with the tentative support 10.

Figure 1F:
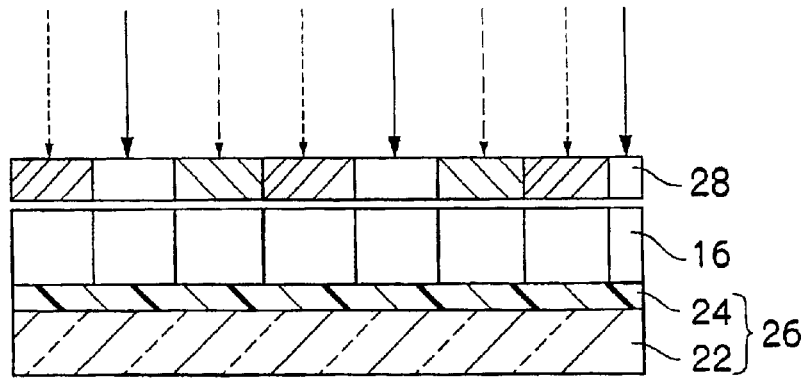
FIGS. 1F to 1H are schematic drawings showing the steps to produce a selectively reflective film (color filter) of the present invention which imagewise represents three colors reflection (R, G and B).

After the transfer, the cholesteric liquid crystal layer 16 is maintained in a non-liquid crystal state. Thus, as illustrated in FIG. 1F, a photomask 28, which has plural areas different in light-transmissivity, is arranged to closely adjacent to the cholesteric liquid crystal layer 16. The cholesteric liquid crystal layer 16 is then imagewise irradiated through the photomask 28 with a first light. After the irradiation, the cholesteric liquid crystal layer 16 is heated to a temperature to cause isomerization of the photoreactive chiral compound in accordance with the irradiation quantity of light such that a liquid crystal state exhibiting a selectively reflective wavelength can be formed.

In the cholesteric liquid crystal layer 16, the regions having different helical pitches depending on the irradiation quantity of light are formed. For example, there are formed a region in which green light (G) is reflected while blue light (B) and red light (R) are transmitted, a region in which blue light (B) is reflected while green (G) light and red (R) light are transmitted, and a region in which red light (R) is reflected while green light (G) and blue light (B) are transmitted, respectively.

Figure 1G:
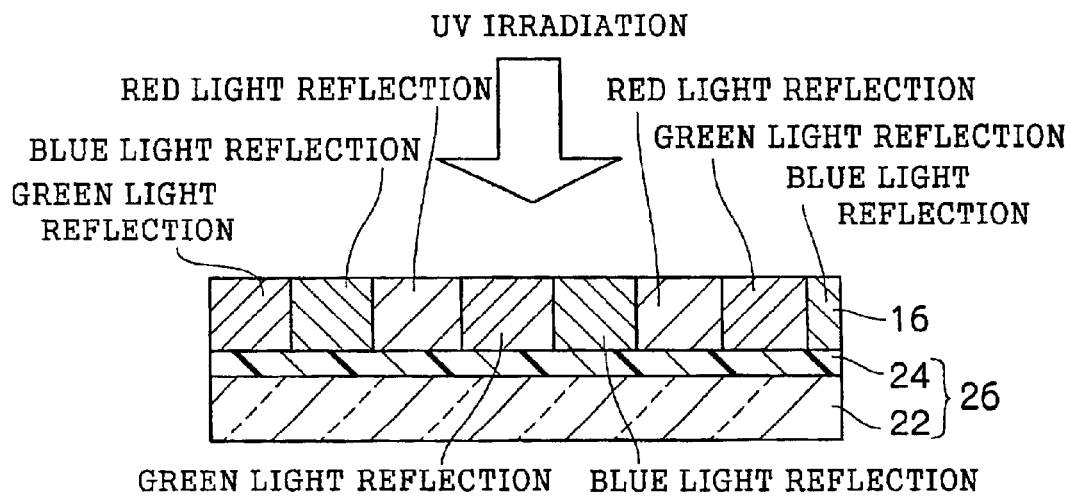

Then, as illustrated in FIG. 1G, the cholesteric liquid crystal layer 16 is further irradiated with ultraviolet rays having an illumination intensity different from that of light used in the step described above (FIG. 1F), such that the pattern is fixed. Thereafter, using 2-butanone, chloroform or the like, unnecessary portions (for example, remaining portions and non-exposed portions of a cushioning layer, an interlayer and so on) on the cholesteric liquid crystal layer 16 are removed through development with an alkaline solution. Consequently, as illustrated in FIG. 1H, a cholesteric liquid crystal layer (selectively reflective film) having the regions at which B, G and R lights are reflected, respectively, can be formed.

Figure 1H:
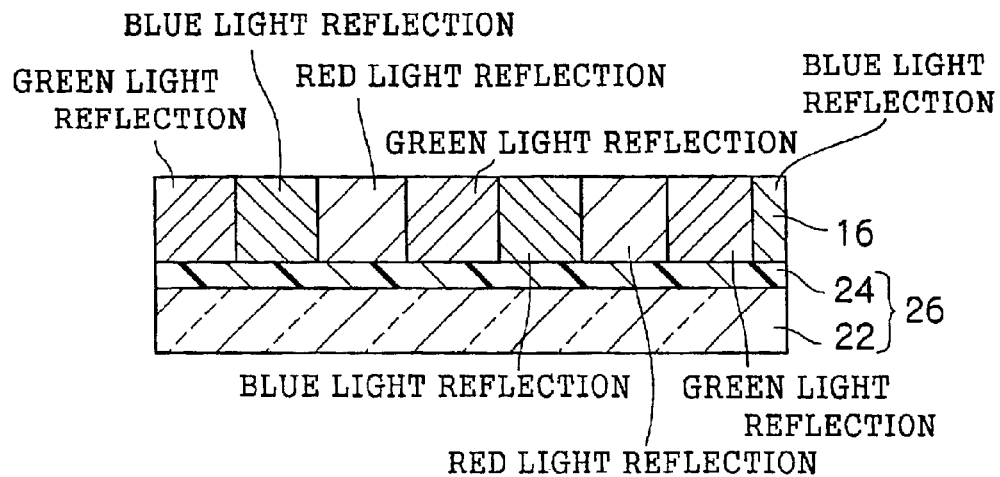

The process illustrated in FIGS. 1A to 1H is an embodiment for producing a color filter according to a laminating method. However, the color filter may be produced according to an applying method in which a coating liquid for a liquid crystal layer is applied directly onto a color filter substrate. If an applying method is used, as compared to the laminating method, a coating liquid for a cholesteric liquid crystal layer is applied onto the alignment layer 24 of the color filter substrate 26 illustrated in FIG. 1C, followed by drying to form a cholesteric liquid crystal layer in a non-liquid crystal state, after which the same steps as illustrated in FIGS. 1F to 1H are conducted.

The steps used, and ingredients for a transfer material, a support and so on are described in detail in Japanese Patent Applications Nos. 11-342896 and 11-343665 previously filed by the inventors.

The liquid crystal composition may have a multi-layered construction in which two or more layers are laminated (for example, a color filter for a transmissive LCD, a circularly polarized light mirror etc., as a brightness-improved film of a transmissive LCD). In this case, the layer-forming step, the latent image-forming step, the image-forming step and the fixing step are carried out plural times.

The process for producing a selectively reflective film of the present invention can suitably be employed not only for producing a (lamination-type) color filter but also for producing a phase-difference film, a circularly polarized light reflector, a brightness-improved film for a transmissive LCD, and so on, which are used in displays such as an LCD.

As described above, patterning is performed while the liquid crystal composition is in a non-liquid crystal state. Hence, even when a mask having areas different in light-transmittance is used for patterning exposure once, diffusion of the isomerized chiral compound between adjacent areas (colored pixels) before fixation can be inhibited, whereby color purity or resolution can effectively be improved. Moreover, mask blemish, which is caused by arranging the mask closely adjacent to the liquid crystal composition layer at the time of patterning exposure, can be avoided.

<Selectively Reflective Film>

The selectively reflective film of the present invention, which comprises a cholesteric liquid crystal composition, can be produced by the above described process of the present invention. The final form of a selectively reflective film is not particularly limited. The produced film may be in the form of a sheet composed of the liquid crystal composition alone, or have a form in which a layer containing the liquid crystal composition (a liquid crystal layer) is disposed on a desired support or a tentative support, or the like form. Alternatively, some additional layers (films) such as an alignment layer or a protective layer may further be provided.

As described above, by employing the cholesteric liquid crystal composition, there can be provided a selectively reflective film of non-light-absorbing type, which is capable of reflecting light of a wide range of wavelengths, i.e., exhibits various color hues, with high color purity and resolution. For example, a color filter excellent in producing primary colors (B, G and R) having high color purity can be obtained without causing color-blurring between pixels, whereby high resolution can be achieved.

The selectively reflective film of the present invention can appropriately be used not only for a (lamination-type) color filter but also a phase-difference film, a circularly polarized light reflector, a brightness-improved film for a transmissive LCD, and so on, which are used in displays such as an LCD.

EXAMPLES

The present invention will now be illustrated by the following examples, but it is to be understood that the present invention is not limited to thereto.

Example 1

(1) Preparation of a Substrate

A coating liquid for a polyimide alignment layer (LX-1400, produced by Hitachi Chemical DuPont Co., Ltd.) was applied onto a glass substrate using a spin coater, followed by drying in an oven at 100° C. for 5 minutes and subsequent heating in the oven at 250° C. for one hour for baking, to thereby form an alignment layer. Then, an aligning treatment was conducted on the surface of this layer by rubbing to prepare a glass substrate having formed thereon an alignment layer.

(2) Formation of a Filter Layer

A coating liquid for a photosensitive liquid crystal layer prepared according to the following formulation (1) was applied using a spin coater onto the alignment layer disposed on the glass substrate produced as above, followed by drying in the oven at 100° C. for 2 minutes to thereby form a photosensitive liquid crystal layer (liquid crystal composition layer) (layer-forming step). The thickness of the layer was measured using a confocal microscope and found to be 2.1 $\mu$m.

<Formulation of Coating Liquid for Photosensitive Liquid Crystal Layer (1)>

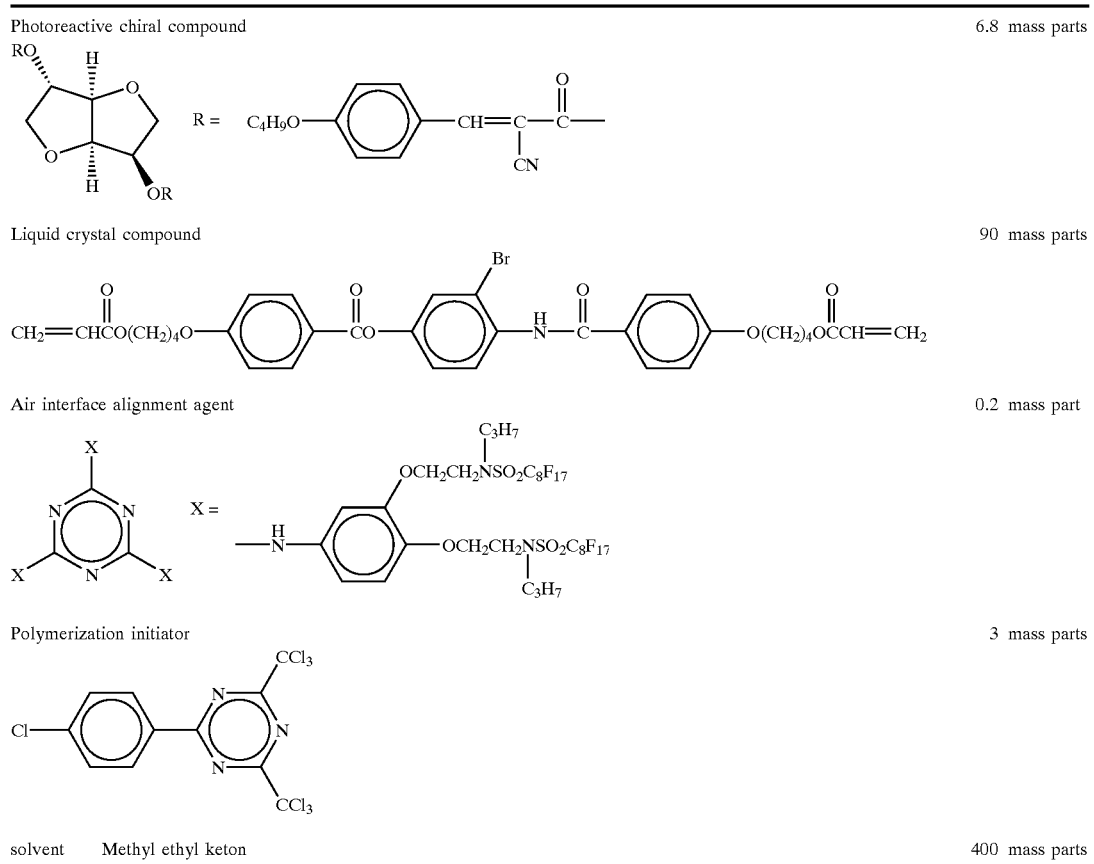

| | |
|---|---|
| Photoreactive chiral compound | 6.8 mass parts |
| Liquid crystal compound | 90 mass parts |
| Air interface alignment agent | 0.2 mass part |
| Polymerization initiator | 3 mass parts |
| solvent    Methyl ethyl keton | 400 mass parts |

Then, the glass substrate having disposed thereon the photosensitive liquid crystal layer was allowed to stand at room temperature, thereby crystallizing the photosensitive liquid crystal layer (into a microcrystalline state). Then, the photosensitive liquid crystal layer was irradiated with light for patterning by means of a superhigh pressure mercury lamp at an illumination intensity of 15 mW/cm$^2$ for 1 second through a photomask with apertures each in the shape of a stripe of 80 μm in line width at pitches of 270 μm and an interference filter having a central wavelength of transmission at 365 nm, with maintaining contact with the layer. Then, the photomask was shifted stepwise by 90 μm in the direction of the line width to perform additional irradiation for 3 seconds using an interference filter and a light source similar to those employed above (latent image-forming step).

During these steps, the liquid crystal component present in the photosensitive liquid crystal layer did not stick to the photomask arranged to contact with this layer.

Then, the glass substrate having disposed thereon the photosensitive liquid crystal layer was maintained on a hot plate, with rendering the surface of the substrate contact with the hot plate. The photosensitive liquid crystal layer was heated to 90° C. to allow transformation into a liquid crystal state (liquid crystal phase), whereby a good alignment (color development) was obtained (imaging step). At this point (at 90° C.), the region irradiated with light for 1 second at the initial stage exhibited selective reflection of green light, the region irradiated with light for 3 seconds at the next step exhibited selective reflection of red light, and the region not irradiated with light exhibited selective reflection of blue light. As described above, a pattern exhibiting selective reflection of green, red and blue light was formed in the photosensitive liquid crystal layer.

Under this temperature and nitrogen atmosphere, irradiation was conducted using a superhigh pressure mercury lamp at an illumination intensity of 40 mW/cm$^2$ for 10 seconds through an interference filter having a central wavelength of transmission at 312 nm such that the liquid crystal layer was hardened (fixing step).

Thus, a selective reflection film to develop R, G and B colors was formed on the glass substrate to thereby produce a color filter. The thus produced color filter was free from a decrease in color purity, resulting from blurring of color hues at pixel boundaries, and had excellent resolution.

Example 2

First, a glass substrate having disposed thereon an alignment layer was produced in the same manner as conducted in Example 1. Then, a filter layer was formed in the following manner.

The alignment layer disposed on the glass substrate was coated with a coating liquid for a photosensitive liquid crystal layer prepared according to the following formulation (2) by means of a spin coater, followed by drying in an oven at 150° C. for 1 minute to form a photosensitive liquid crystal layer (liquid crystal composition layer) (layer-forming step). The layer thickness was measured using a confocal microscope and found to be 2.2 μm.

<Formulation of Coating Liquid for Photosensitive Liquid Crystal Layer (2)>

Liquid crystal compounds

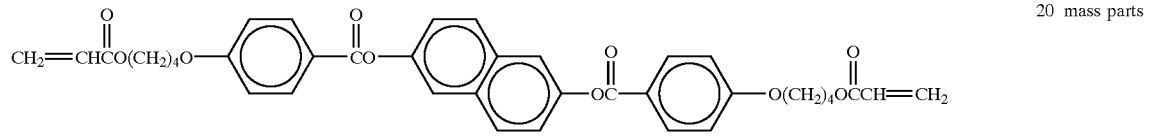 20 mass parts

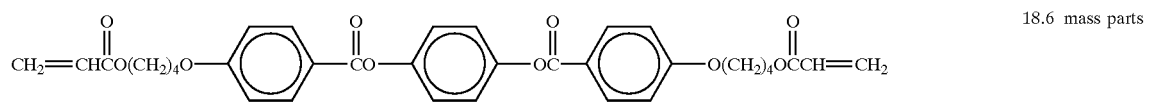 18.6 mass parts

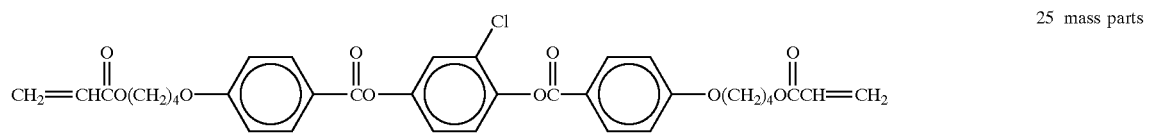 25 mass parts

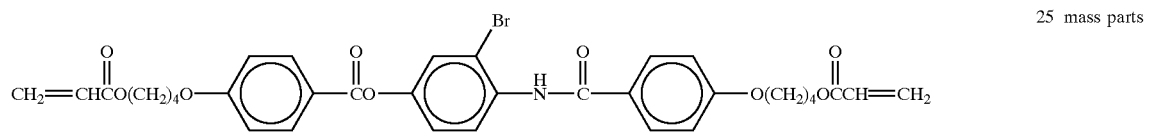 25 mass parts

Photosensitive chiral compound 8.2 mass parts

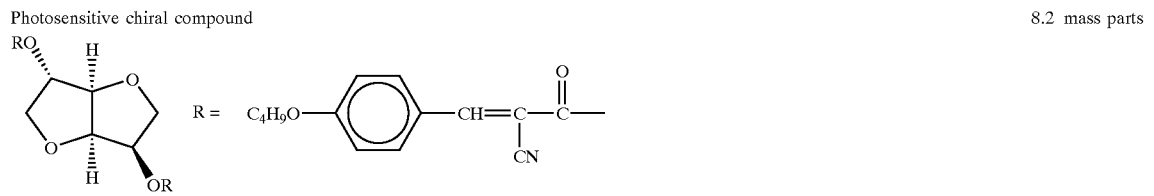

Air interface alignment agent 0.2 mass parts

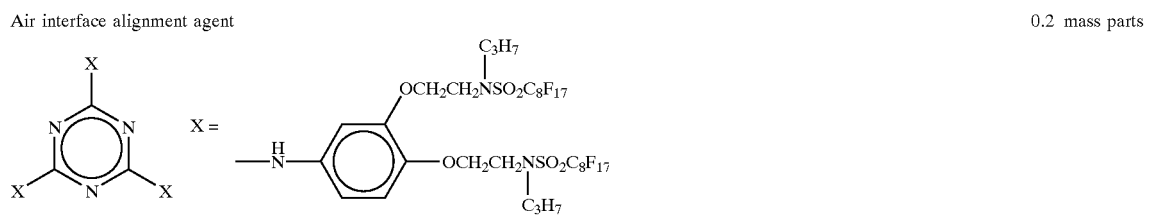

Polymerization initiator 3 mass parts

solvent  Chloroform 400 mass parts

Then, the glass substrate having disposed thereon the photosensitive liquid crystal layer was formed was rapidly cooled to room temperature, to make the photosensitive liquid crystal layer transformed into a glass state. Under this temperature, the photosensitive liquid crystal layer was irradiated with light for patterning by means of a superhigh pressure mercury lamp at an illumination intensity of 15 mW/cm² for 1.5 seconds through a photomask with apertures each in the shape of a stripe of 80 μm in line width at pitches of 270 μm and an interference filter having a central wavelength of transmission at 365 nm, with maintaining contact with the hot plate. Then, the photomask was shifted stepwise by 90 μm in the direction of the line width to perform another irradiation for 4 seconds using an interference filter and a light source similar to those employed above (latent image-forming step).

During these steps, the liquid crystal component present in the photosensitive liquid crystal layer did not stick to the photomask arranged to contact with this layer.

Then, the glass substrate having disposed thereon the photosensitive liquid crystal layer was maintained on a hot plate, with rendering the surface of the substrate to contact with the hot plate. The photosensitive liquid crystal layer was heated to 90° C. to allow transformation into a liquid crystal state (liquid crystal phase), whereby a good alignment (color development) was obtained (imaging step). At this point (at 90° C.), the region irradiated with light for 1.5 seconds at the initial stage exhibited selective reflection of green light, the region irradiated with light for 4 seconds at the next step exhibited selective reflection of red light, and the region not irradiated with light exhibited selective reflection of blue light. As described above, a pattern exhibiting selective reflection of green, red and blue light was formed in the photosensitive liquid crystal layer.

Under this temperature and nitrogen atmosphere, irradiation was carried out using a superhigh pressure mercury lamp at an illumination intensity of 40 mW/cm$^2$ for 10 seconds through an interference filter having a central wavelength of transmission at 312 nm such that the liquid crystal layer was hardened (fixing step).

Thus, a selective reflection film to develop R, G and B colors was formed on the glass substrate to thereby produce a color filter. The thus produced color filter was free from a decrease in color purity, resulting from blurring of color hues at pixel boundaries, and hence had excellent resolution.

According to the present invention, there is provided a process for readily producing a selectively reflective film through a simple and easily practicable aligning treatment. The process avoids a decrease in color purity and in resolution, resulting from blurring of color hues at pixel boundaries, achieves selectively reflected color hues having higher color purity and excellent resolution, and further prevents mask blemish. In addition, there is provided a selectively reflective film capable of exhibiting high selectively reflected color hues and excellent resolution, by employing the production process described above.

What is claimed is:

1. A process for producing a selectively reflective film comprising the steps of:

forming, on a substrate, a liquid crystal composition layer exhibiting a smectic phase state, a microcrystalline state or a glass state, the liquid crystal composition containing a photoreactive chiral compound, a polymerization initiator, and a liquid crystal compound having at least one polymerizable group;

establishing a distribution of exposure in the liquid crystal composition layer by irradiating the liquid crystal composition layer exhibiting the smectic phase state, the microcrystalline state or the glass state with a first light;

forming a selectively reflective area in accordance with the distribution of exposure by raising the temperature of the liquid crystal composition layer, in which the distribution has been established, such that the liquid crystal composition is transformed to a liquid crystal state; and hardening the liquid crystal composition by irradiating the liquid crystal composition layer, in which the selectively reflective area has been formed, with a second light to cause polymerization or cross-linking.

2. The process for producing a selectively reflective film according to claim 1, wherein the liquid crystal composition layer is formed by applying a coating liquid in which the liquid crystal composition is dissolved in a solvent.

3. The process for producing a selectively reflective film according to claim 1, wherein the liquid crystal composition comprises an air interface alignment agent.

4. The process for producing a selectively reflective film according to claim 3, wherein the air interface alignment agent is a nonionic surfactant.

5. The process for producing a selectively reflective film according to claim 4, wherein the content of the air interface alignment agent is from 0.05 to 5% by mass relative to a total solid content of the liquid crystal composition.

6. The process for producing a selectively reflective film according to claim 1, wherein the selectively reflective area comprises at least two regions having different selectively reflective wavelengths.

7. The process for producing a selectively reflective film according to claim 1, wherein the liquid crystal compound is a nematic liquid crystal compound having anisotropy of a refractive index Δn of 0.10 to 0.40.

8. The process for producing a selectively reflective film according to claim 1, wherein the content of the liquid crystal compound is from 30 to 98% by mass relative to a total solid content of the liquid crystal composition.

9. The process for producing a selectively reflective film according to claim 1, wherein the content of the photoreactive chiral compound is from 2 to 30% by mass relative to a total solid content of the liquid crystal composition.

10. The process for producing a selectively reflective film according to claim 1, wherein the content of the polymerization initiator is from 0.1 to 20% by mass relative to a total solid content of the liquid crystal composition.

11. A selectively reflective film obtained by a production process comprising the steps of:

forming, on a substrate, a liquid crystal composition layer exhibiting a smectic phase state, a microcrystalline state or a glass state, the liquid crystal composition containing a photoreactive chiral compound, a polymerization initiator, and a liquid crystal compound having at least one polymerizable group;

establishing a distribution of exposure in the liquid crystal composition layer by irradiating the liquid crystal composition layer exhibiting the smectic phase state, the microcrystalline state or the glass state with a first light;

forming a selectively reflective area in accordance with the distribution of exposure by raising the temperature of the liquid crystal composition layer, in which the distribution has been established, such that the liquid crystal composition is transformed to a liquid crystal state; and hardening the liquid crystal composition by irradiating the liquid crystal composition layer, in which the selectively reflective area has been formed, with a second light to cause polymerization or cross-linking.

12. The selectively reflective film according to claim 11, wherein the liquid crystal composition layer is formed by applying a coating liquid in which the liquid crystal composition is dissolved in a solvent.

13. The selectively reflective film according to claim 11, wherein the liquid crystal composition comprises an air interface alignment agent.

14. The selectively reflective film according to claim 13, wherein the air interface alignment agent is a nonionic surfactant.

15. The selectively reflective film according to claim 14, wherein the content of the air interface alignment agent is from 0.05 to 5% by mass relative to a total solid content of the liquid crystal composition.

16. The selectively reflective film according to claim 11, wherein the selectively reflective area comprises at least two regions having different selectively reflective wavelengths.

17. The selectively reflective film according to claim 11, wherein the liquid crystal compound is a nematic liquid crystal compound having anisotropy of a refractive index $\Delta n$ of 0.10 to 0.40.

18. The selectively reflective film according to claim 11, wherein the content of the liquid crystal compound is from 30 to 98% by mass relative to a total solid content of the liquid crystal composition.

19. The selectively reflective film according to claim 11, wherein the content of the photoreactive chiral compound is from 2 to 30% by mass relative to a total solid content of the liquid crystal composition.

20. The selectively reflective film according to claim 11, wherein the content of the polymerization initiator is from 0.1 to 20% by mass relative to a total solid content of the liquid crystal composition.

* * * * *